United States Patent Office 3,203,975
Patented Aug. 31, 1965

3,203,975
PURIFICATION OF ACETRONITRILE AND PROPIONITRILE
Seymour Sobel, Cedar Grove, and Vincent J. Iapelli, Lodi, N.J., assignors to Universal Oil Products Company, Des Plaines, Ill., a corporation of Delaware
No Drawing. Filed Sept. 5, 1962, Ser. No. 221,453
2 Claims. (Cl. 260—465.1)

This invention relates to a novel process for the purification of contaminated organic compounds and particularly to a process for the removal of basic compounds therefrom. More particularly the invention is concerned with a process for removing contaminants from organic nitrogen-containing, water-soluble compounds.

In many chemical processes the requirement of pure products free from any possible contaminants is a necessity. The presence of contaminants may lead to final impure products which will thereafter require further purification by means of relatively expensive equipment or, the presence of contaminants may impede the desired reaction thus resulting in loss of final product which may, in some instances, render the process economically unfeasible to operate. Therefore, it is necessary in many chemical processes to remove contaminating influences from starting materials so that the purified product may then be utilized in other chemical processes in an economically attractive manner of operation. For instance, certain organic nitrogen-containing, water-soluble compounds such as acetonitrile which find a wide variety of use in the chemical industry such as an intermediate in the organic synthesis of vitamin B, pharmaceuticals, perfumes, extracts, as a denaturant, a crystallization medium and as a specialized solvent for certain types of polymers, may be contaminated by the presence of certain impurities such as cyanide, ammonia, pyridine bases or derivatives, etc. Therefore, in order to utilize the acetonitrile as a solvent for certain types of polymers whereby the polymeric product is not affected, it is necessary to purify said acetonitrile in such a manner so that the contaminants contained therein are removed to such a degree as to no longer effect the utilization of such acetonitrile in any manner whatsoever.

The present process is particularly directed to the removal of basic compounds and specifically to nitrogen-containing basic compounds such as ammonia, pyridine derivatives or bases, etc. from organic nitrogen-containing, water-soluble compounds such as acetonitrile (methyl cyanide), propionitrile (ethyl cyanide), etc. The term "pyridine bases" as used in the present specification and appended claims will be understood to include pyridine, pyridine derivatives and pyridine bases. Certain methods of removing nitrogen-containing basic compounds from hydrocarbons or other organic compounds have been known in the prior art, such methods including the use of strong mineral acids such as, for example, concentrated sulfuric acid, hydrochloric acid, etc., whereby the nitrogen bases form sulfates, chlorides, etc., with the acids. However, the use of such strong acids may cause deterioration of the nitrogen-containing, water-soluble compound by way of hydrolysis, polymerization and/or decomposition, said deterioration then resulting in the formation of other impurities with a correspondingly lower yield of the desired product. This formation of further impurities then requires further purification to remove the aforesaid new impurities. Other forms of purification as shown in the prior art utilize organic carboxylic acids to remove impurities. However, when acids are utilized for the removal of basic compounds, it is from hydrocarbon fractions and more specifically water-insoluble hydrocarbon fractions rather than from water-soluble compounds which contain other elements besides carbon and hydrogen atoms.

In contradistinction to these prior art methods, we have now discovered that basic compounds and particularly nitrogen-containing basic compounds may be removed from nitrogen-containing, water-soluble organic compounds by utilization of certain decontaminating compounds, the use of which does not result in the formation of other impurities.

It is, therefore, an object of this invention to provide a process for the removal of contaminants from certain organic substances whereby the latter may be recovered in a relatively purified condition.

Another object of this invention is to provide a process for the removal of contaminants from certain organic compounds which are nitrogen-containing and are water-soluble in nature by treatment with a drying compound, and acidification of the resultant mixture to provide relatively pure organic compounds.

Taken in its broadest aspect one embodiment of this invention resides in a process for the removal of contaminants from an organic nitrogen-containing, water-soluble compound which comprises treating said compound with calcium chloride, acidifying the resultant mixture, separating the resultant oil layer, thereafter further treating said oil layer with additional calcium chloride, and recovering the purified organic compound.

A further embodiment of this invention resides in a process for the removal of contaminants from an organic nitrogen-containing, water-soluble compound which comprises treating said compound with calcium chloride, acidifying the resultant mixture with hydrochloric acid, separating the resultant oil layer, thereafter further treating said oil layer with additional calcium chloride, and recovering the purified organic compound.

Yet another embodiment of this invention resides in a process for the removal of contaminants from propionitrile which comprises treating said propionitrile with calcium chloride, acidifying the resultant mixture, separating the resultant oil layer, thereafter further treating said oil layer with additional calcium chloride, and recovering the purified propionitrile.

A specific embodiment of this invention is found in a process for the removal of water and pyridine bases from acetonitrile which comprises treating said actonitrile with calcium chloride, acidifying the resultant mixture with hydrochloric acid, separating the resultant oil layer, thereafter further treating the oil layer with additional calcium chloride to remove water and pyridine bases therefrom, and recovering the purified acetonitrile.

Other objects and embodiments will be found in the following further detailed description of this invention.

As hereinbefore set forth, it has now been discovered that certain contaminants or impurities may be removed from water-soluble, nitrogen-containing organic compounds whereby the purified product may be obtained in specification grade purity. This is especially true when the contaminant or impurity comprises nitrogen-containing basic compound, the most common of which being pyridine bases. As hereinbefore set forth, these pyridine bases may be present as a side product formed during the process in which the alkyl cyanides such as acetonitrile, propionitrile, etc., are prepared.

Another contaminant which may be present in compounds of the present type, that is, nitrogen-containing, water-soluble organic compounds, is water. In order to prepare specification grade compounds this water must also be removed along with other impurities of the type hereinbefore set forth, namely, pyridine bases. It has now been discovered that water and pyridine bases may be removed in a single step by first treating the impurity-containing organic compound of the type hereinbefore set forth, with a drying agent. The preferred drying agent comprises calcium chloride although other well known drying agents such as alkali metal salts and alkaline earth metal salts including sodium chloride, potassium chloride, magnesium chloride, magnesium sulfate, sodium sulfate, potassium sulfate, the salts of lithium, strontium, cesium, rubidium, barium, etc., may also be used within the scope of this invention. It is also contemplated within the scope of this invention that the bromide and iodide salts of these alkali and alkaline earth metals may be used, along with the corresponding hydrobromic and hydroiodic acids, although not necessarily with equivalent results. Following this the resultant mixture is then acidified with an aqueous acid such as strong inorganic acids including, but not limited to, hydrochloric acid, sulfuric acid, the various phosphoric acids, etc. The resulting upper or oil layer containing the nitrogen-containing, water-soluble organic compound is then separated and further treated with an additional amount of a drying agent. The drying agent which is used may be similar to that used in the first step or, if so desired, dissimilar. It is contemplated within the scope of this invention that the aforementioned steps of the process are effected at atmospheric temperatures and pressures. However, if it is necessary for some reason to use elevated temperatures, such as, for example, from about 50° to about 100° C. or more, the reaction may also be effected at elevated pressures ranging from about 2 to about 50 atmospheres or more, the amount of pressure used being that which is necessary to maintain a major portion of the reactants in the liquid phase.

The process of this invention may be effected in any suitable manner and may comprise either a batch or continuous type operation. For example, when a batch type operation is used, a quantity of the water-soluble, nitrogen-containing organic compound containing contaminants such as nitrogen-containing bases including pyridine bases, water, etc., is added to a reaction vessel containing a suitable drying agent such as calcium chloride and sufficient acid of the type hereinbefore set forth so that the solution has a pH of less than 5. The resulting mixture is constantly agitated for a predetermined period of time in the range of from about 1 to about 5 hours or more. Following this the organic or oil layer is separated from the drying agent and acid placed in another reaction vessel along with an additional amount of drying agent which may be the same as that used in step 1 or, if so desired, a different drying agent. After further agitation for a period of time in the range of from about 1 to about 5 hours the organic layer is separated from the drying agent and recovered.

It is also contemplated within the scope of this invention that this process may be effected in a continuous manner, although not necessarily with equivalent results. For example, the organic compound containing contaminants such as pyridine bases and water, may be continuously charged to a reaction vessel which contains a drying agent and sufficient acid to maintain a pH of less than 5. The reaction vessel which is maintained at the proper operating conditions of temperature and pressure may be provided with stirring means whereby the mixture may be subjected to constant agitation. Additional drying agent and acid are also charged to the reactor in amounts necessary to maintain the proper balance of reactants. After a predetermined residence time the organic compound is withdrawn, separated from any drying agent and acid which may have been also withdrawn and continuously passed to a second reactor which is provided with a drying agent and stirring means. After a predetermined residence time in the second reactor, during which time the mixture is continuously agitated, a purified organic compound is withdrawn, separated from any drying material and recovered by conventional means.

The following examples are given to illustrate the process of the present invention which, however, are not intended to limit the generally broad scope of the present invention in strict accordance therewith.

Example I

In this example 1,000 grams of acetonitrile containing 3,700 parts per million of volatile basic compounds calculated as ammonia and 29 g. of water per 100 cc. of sample was treated with 100 grams of calcium chloride and 22 grams of hydrochloric acid, the calcium chloride and hydrochloric acid being added with constant stirring of the mixture. The 22 grams of hydrochloric acid was sufficient to maintain a pH of less than 5 in the solution. After 2.5 hours of constant agitation 636 grams of the upper layer was separated and further agitated for an additional period of 3 hours with 25 grams of calcium chloride. The upper layer was then drawn off and subjected to analysis, said analysis disclosing the presence of 1.9% of water and an acidity of 0.03% calculated as hydrochloric acid.

To demonstrate the removal of the volatile basic compounds 1% of calcium oxide was added and the product was flashed away. Analysis of the distillate showed 23 parts per million of volatile basic compounds calculated as ammonia.

Example II

In this example 3,000 grams of acetonitrile containing 3,700 parts per million of volatile basic compounds calculated as ammonia and 29 grams of water per 100 cc. of sample was treated with 300 grams of calcium chloride, the addition of calcium chloride being accompanied by continuous stirring and cooling to a temperature of between 25° and 30° C. The reaction mixture was treated with 66 cc. of 20% hydrochloric acid, this amount being sufficient to maintain a pH of less than 5. The upper layer comprising 1,920 grams was separated and stirred with 77 grams of fresh calcium chloride. Following this, 1,780 grams of upper layer was separated and submitted to analysis, the analysis disclosing the fact that said upper layer contained 0.075% of acid calculated as hydrochloric acid and 2.2% of water. A 1000 gram aliquot portion of the treated acetonitrile was fractionated over 0.68 gram of calcium hydroxide and 0.22 gram of calcium oxide. After 163 grams of head was taken at a reflux ratio of approximately 10:1 a product comprising 786 grams of a cut was taken at a reflux ratio of approximately 0.5:1. This cut was also analyzed and found to contain 4.6 parts per million of volatile basic compounds calculated as ammonia.

We claim as our invention:

1. A process for the removal of water and at least one nitrogen-containing basic compound selected from the group consisting of ammonia, pyridine and pyridine bases from an organic compound selected from the group consisting of acetonitrile and propionitrile which comprises treating said organic compound simultaneously with calcium chloride and an inorganic acid selected from the group consisting of hydrochloric, sulfuric and phosphoric acids at a temperature of from atmospheric to about 100° C., a pressure of from atmospheric to about 50 atmospheres, a time period of from about 1 to about 5 hours and a pH of less than 5, separating the resultant oil layer from the calcium chloride and acid, further treating the separated oil layer with additional calcium chloride, and recovering the purified nitrile.

2. A process for the removal of water and at least one nitrogen-containing basic compound selected from the group consisting of ammonia, pyridine and pyridine bases from an organic compound selected from the group consisting of acetonitrile and propionitrile which comprises treating said organic compound simultaneously with calcium chloride and hydrochloric acid at a temperature of from atmospheric to about 100° C., a pressure of from atmospheric to about 50 atmospheres, a time period of from about 1 to about 5 hours and a pH of less than 5, separating the resultant oil layer from the calcium chloride and acid, further treating the separated oil layer with additional calcium chloride, and recovering the purified nitrile.

References Cited by the Examiner
UNITED STATES PATENTS

| | | | |
|---|---|---|---|
| 1,894,301 | 1/33 | Bockmuhl et al. | 260—465.1 |
| 2,145,803 | 1/39 | Ralston et al. | 260—465.1 |
| 2,548,369 | 4/51 | Harwood et al. | 260—465.1 X |
| 2,560,931 | 7/51 | Chapman et al. | 260—465.1 X |

CHARLES B. PARKER, *Primary Examiner.*